July 1, 1924.  
R. F. HALL  
MACHINE FOR THE MANUFACTURE OF GLASS ARTICLES  
Original Filed March 13, 1918    6 Sheets-Sheet 5

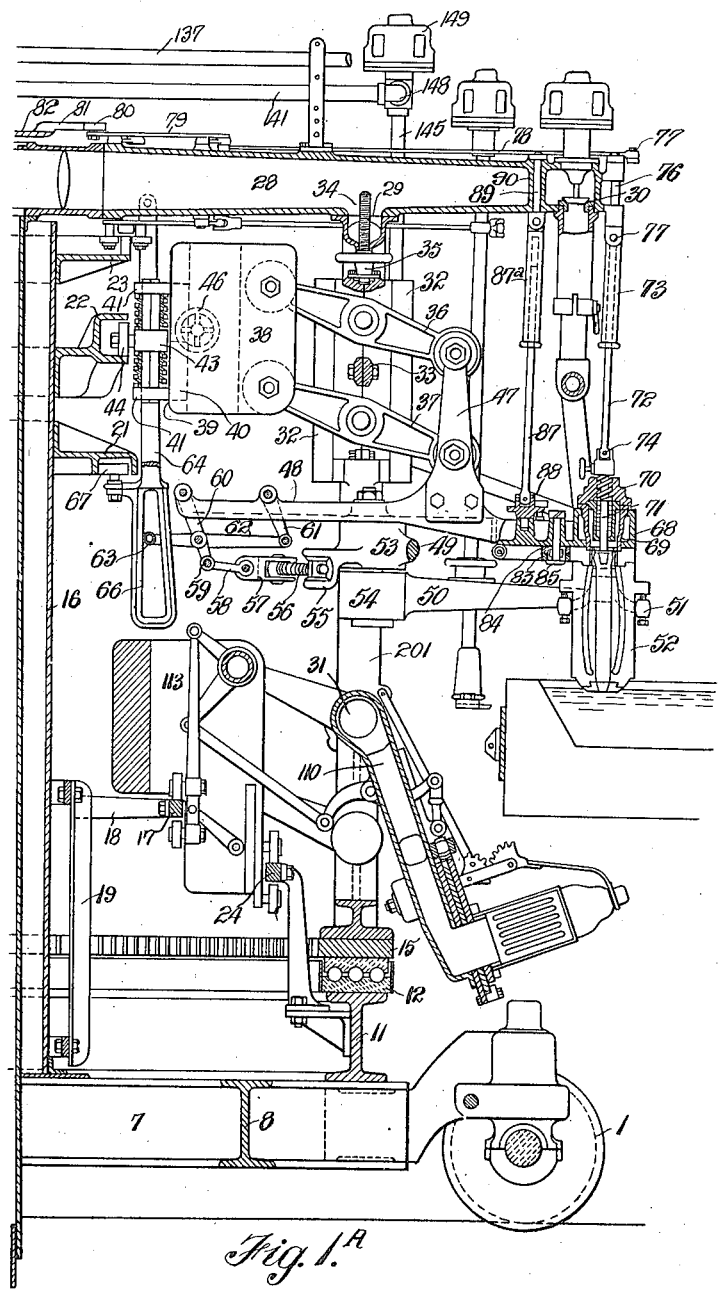
Fig. 1.ᴬ

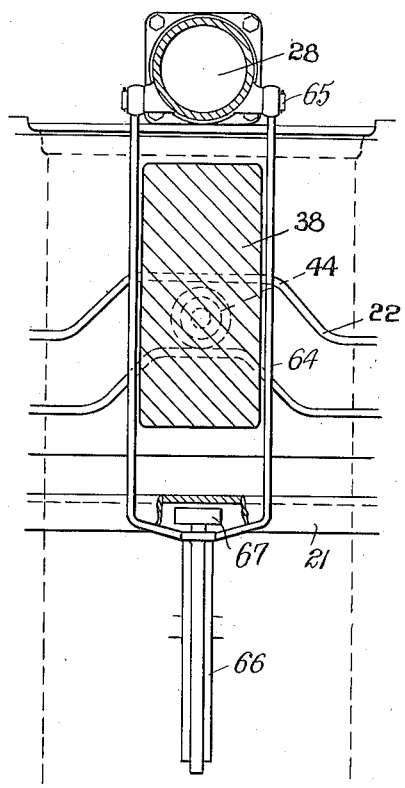
Fig. 1.E.
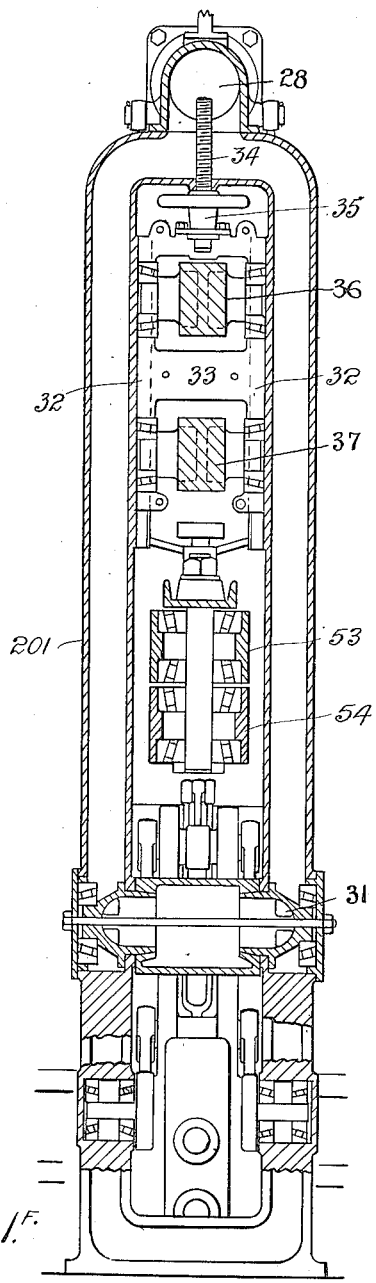
Fig. 1.F.

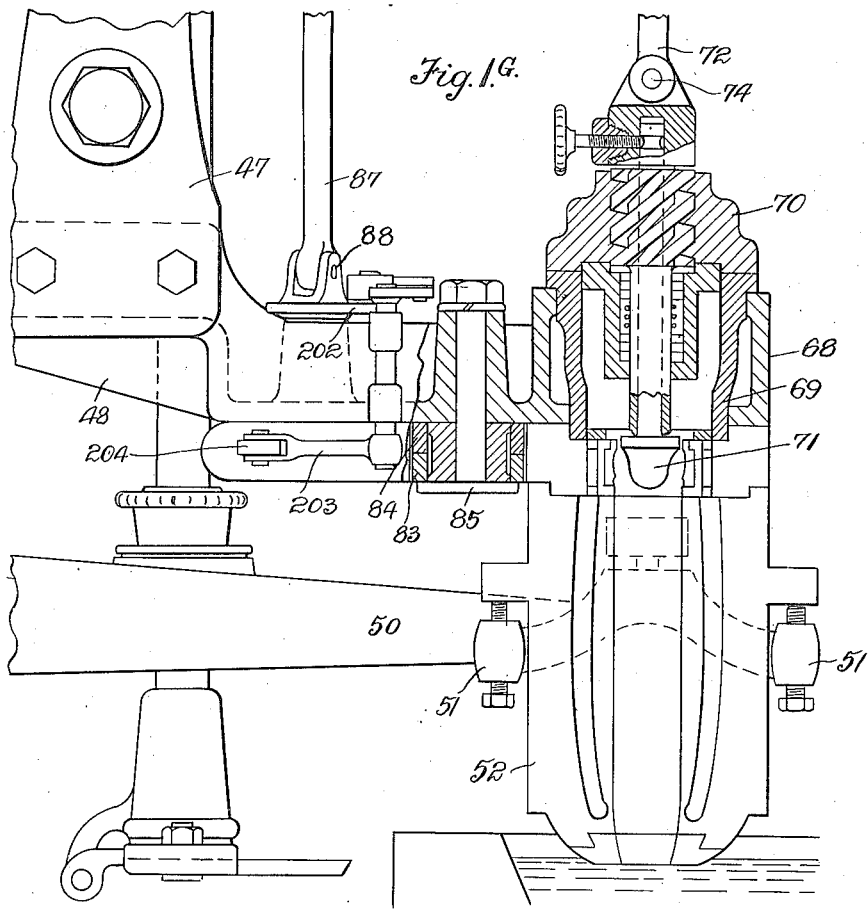
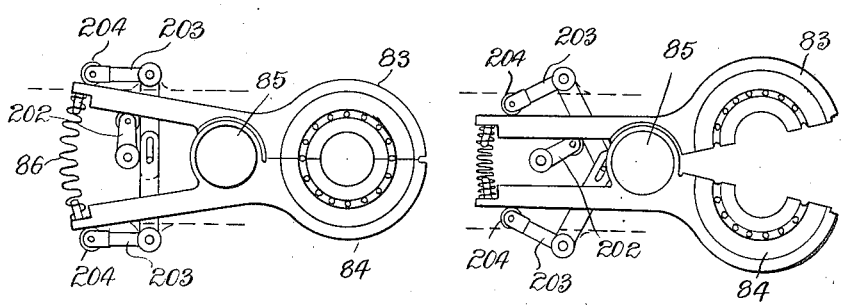

1,499,524

Inventor:
R. F. Hall
By his attorneys,
Baldwin Wight

July 1, 1924.
R. F. HALL
1,499,524
MACHINE FOR THE MANUFACTURE OF GLASS ARTICLES
Original Filed March 13, 1918   6 Sheets-Sheet 6
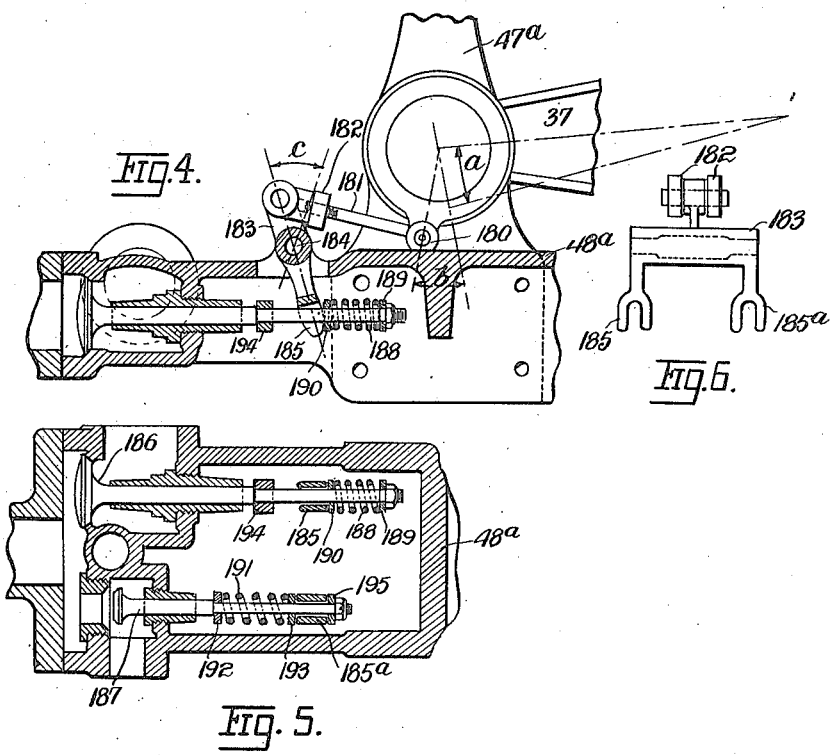

Patented July 1, 1924.

1,499,524

UNITED STATES PATENT OFFICE.

ROBERT FREDERICK HALL, OF MOSELEY, NEAR BIRMINGHAM, ENGLAND.

MACHINE FOR THE MANUFACTURE OF GLASS ARTICLES.

Original application filed March 13, 1918, Serial No. 222,257. Divided and this application filed July 27, 1920. Serial No. 399,429.

(GRANTED UNDER THE PROVISIONS OF THE ACT OF MARCH 3, 1921, 41 STAT. L., 1313.)

*To all whom it may concern:*

Be it known that I, ROBERT FREDERICK HALL, a subject of the King of Great Britain and Ireland, residing at Moseley, near Birmingham, in the county of Warwick, England, have invented certain new and useful Improvements in Machines for the Manufacture of Glass Articles (for which I have filed an application in Great Britain No. 13,458, filed Sept. 19, 1917), of which the following is a specification.

This application is a division of my application for patent Serial No. 222,257, filed March 13, 1918.

This invention relates to rotary machines for the manufacture of glass articles, and refers to that type of such machines in which the molten glass from which the articles are to be formed is drawn by means of suction into a parison or other mould, the said mould being open at the bottom and being lowered to the surface of the molten glass, to enable the glass to be drawn into the interior thereof, after which the mould is raised and the parison therein contained is carried through the various operations necessary for the production of the finished article.

In rotary machines of the foregoing type, it has already been proposed to mount, on a skeleton framework or spider a series of parison moulds, the frame being reciprocated vertically during revolution, to dip the lower edge of each parison mould into the molten glass.

It has also been proposed to provide a principal rotating frame work or spider in which are mounted a number of frames each carrying a parison mould and its auxiliary parts, to provide means for adjusting the height of each frame above the glass tank and to counterbalance each frame and the auxiliary parts by means of a suitable weight, each such frame being lowered and raised vertically, while the machine continuously rotates, by a lever connected with it and co-operating with a horizontal cam disc.

My present invention relates more particularly to the parison moulds and their associated parts and has for one of its objects to provide improved means for carrying, raising and lowering the said moulds and associated parts.

A further object of the invention is to provide improved means for adjusting the height of the said moulds with respect to the molten glass so as to allow for a greater range of adjustment than is possible with the machines as at present constructed.

Other objects of the invention will be referred to in the specification as regards minor constructional details and arrangements.

In the general way of carrying out my invention I provide for carrying each parison mould a pair or pairs of parallel levers of the first order. Each lever of each pair has pivotally connected thereto at one end a link or its equivalent carrying the parison mould and its associated parts and is pivotally connected at the other end to a link or its equivalent, in such a way that a parallel lever mechanism is obtained. I further provide means for causing the levers to be turned about their fulcrums, for the purpose of lowering and raising the mould at appropriate times.

For effecting the lowering and raising I may employ a suitable cam or cams, an electric solenoid or fluid pressure, or a combination of all or any of such means.

I prefer to provide a counterbalance weight constituting or attached to the link connected to the ends of the levers opposite to those connected to the link carrying the parison mould, and its associated parts for facilitating the operation of lowering and raising the mould.

I also prefer to mount the parallel link mechanism in a frame which is fixed during the working of the machine but which can be raised and lowered with respect to and locked in position in the main rotating framework of the machine in order to adjust the apparatus for parison moulds of different lengths.

I also prefer to mount the mechanism carrying the parison mould in an elongated loop or its equivalent which can be easily placed in position so as to constitute an integral portion of the main framework of the machine and easily removed when required, by which means the assembling and taking to pieces of the machine are greatly facilitated.

In some cases I so arrange that the suction valve is automatically opened and/or closed by means operated by the lowering and/or raising of the parison mould: and if desired the orifice of the blowing pipe may also be automatically opened when the parison mould is raised and closed when it is lowered.

In order to facilitate the understanding of the invention a machine embodying its chief features and adapted for the manufacture of bottles will now be described by way of example, with reference to the accompanying drawings.

Fig. 1 is a sectional elevation of one half of the machine, the plane of section being broadly speaking diametrical with respect to the framework and the associated mechanisms.

Fig. 1^A is a similar view of the other half of the machine and on the same diameter.

Fig. 1^E is a transverse section showing the method of attaching the arm 64 to the arm 28.

Fig. 1^F is a transverse section through one of the bifurcated columns.

Fig. 1^G is an enlarged view of one of the parison moulds and the adjacent parts thereof.

Figs. 1^H and 1^J are views showing the ring mould in its closed and open positions respectively.

Fig. 4 is a view partly in section.

Fig. 5 is a plan, and

Fig. 6 is a detail view of mechanism for opening and closing the suction valve and orifice of the blowing pipe by the lowering or raising of the parison mould.

The same numerals are employed to denote the same parts in all the views.

Figure 1:
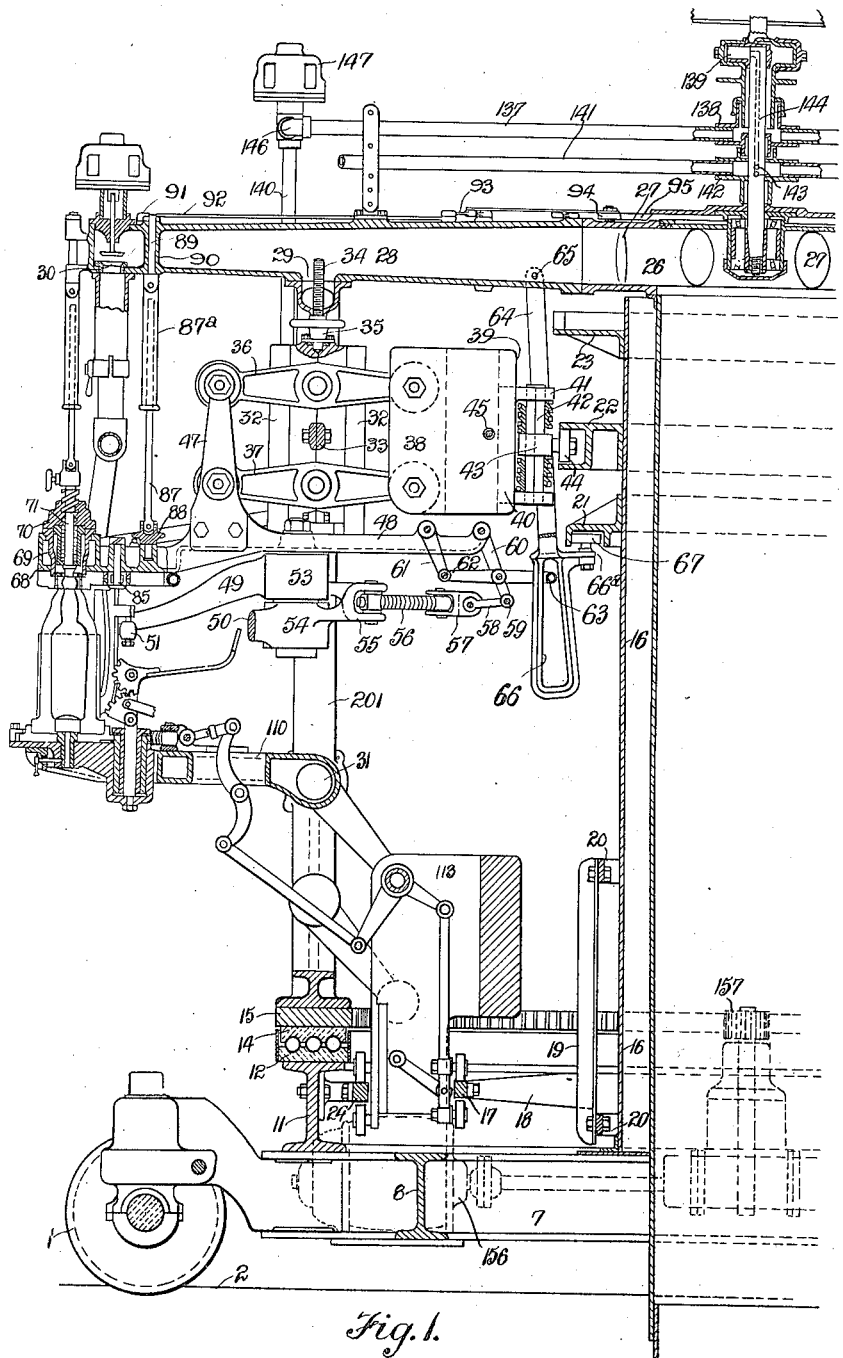

In the following description the details of the machine which are not immediately connected with the present invention are briefly considered in order to enable the general construction and working of the machine to be understood, but they will be found described in greater detail in my co-pending application Serial No. 399,427, filed July 27, 1920.

The machine is supported upon wheels 1, adapted to run upon rails 2 in the neighbourhood of the furnace in the ordinary manner.

These wheels support the main lower framework of the machine which is composed of longitudinally disposed girders 7, connected by transverse girders 8.

The girder framework 7, 8, carries a ring 11, which in turn carries a channelled ring 12, forming the lower member of a ball bearing. 14 is another ring forming the upper member of the ball bearing, and to this latter is attached an internally toothed annulus 15.

Suitably supported upon the lower girder framework 7, 8, is a vertical column 16, carrying the principal non-rotatable parts of the machine.

These parts comprise:—

A large cam 17, carried by brackets 18, connected in turn to vertical struts 19, carried by brackets 20 upon the column 16.

Another cam, in this case a horizontal cam 21, at a higher level.

A vertical cam 22, for raising and lowering the parison mould; and a horizontal cam 23 near the top of the column.

24 is another cam carried by suitable brackets on the fixed framework of the machine.

At the top of the machine is a chamber 26 provided on the outside with a number of projecting faces each having a circular aperture 27 formed therein.

Bolted to each of the faces opposite one of the apertures 27 is a hollow arm 28, which extends radially from the said chamber. Each radial arm is closed at the end but provided with apertures 29 and 30 for the purposes hereinafter explained.

Bolted between each one of the radial arms 28 and the annulus 15 is a column or framework 201, hereinafter termed "the bifurcated column" and it will be seen that when all the bifurcated columns are in position they carry the chamber 26 through the intervention of the radial arms 28 and that the whole rotatable super-structure of the machine is carried by the bearing rings 14.

The columns are formed from castings of H-section at the lower part and solid up to the height of the trunnions 31, from which position to the top they are hollow, so that when each unit or bifurcated column is in position, the interior of the side frames of the column is in communication through the corresponding arm 28 and aperture 27 with the interior of the chamber 26. The inner surfaces of the upper portions of the bifurcated column are machined with plain parallel portions, between which is carried an adjustable framework now about to be described.

This framework consists of two parallel side members 32 adapted to fit against the inner surfaces of the bifurcated column and be held in position as hereafter explained.

These side members are connected by transverse members 33 and the upper member has secured thereto, a screw threaded rod 34, upon which works a nut 35, provided with an operating hand wheel, the nut being so mounted that it is not axially movable so that, by rotating the said nut by means of the hand wheel, the framework constituted by the members 32 and 33 can be raised and lowered for the purposes of adjustment.

Pivoted to the framework 32, 33, by means of suitable bearings are levers of the first order 36 and 37.

Suitably pivoted to the inner ends of the levers 36, 37 is a weight 38. This weight is provided at the inner edge 39, with a receptive machined slideway, within which is slidably mounted a strip 40 carrying at its ends two projecting lugs or the like 41, connected to a bar 42. 43 is a ring slidable on the rod 42 and carrying a cam roller 44.

Between the lugs 41, and the ring 43 are mounted helical compression springs as will be clearly seen on the drawing.

In order to lock the strip 40 in the required position in the channel 39, the edges of the weight 38 are made so that they can be drawn or clamped together at 39 by means of a screw 45 operated by a hand wheel 46.

Pivoted to the outer ends of the levers 36, 37 are links 47 the construction being such that the levers 36, 37, constitute with the weights 38, and the links 47, a parallel link lever mechanism for the purposes hereinafter explained.

Suitably bolted to the links 47, is a casting 48, carrying the blowing head, the ring mould, the parison mould and associated parts.

The arms 49, 50 are provided on their outer ends with parison mould carriers 51, to which the parison moulds 52, are attached in the ordinary well known manner so that the moulds can be easily interchanged and are carried by suitable bearings 53, and 54, on the underside of the casting 48.

The castings forming the arms are provided with extensions 55 connected by toggle links of a known description to a spring buffered push rod 56, connected to a fork 57, in turn connected by a pivoted link 58, to the end 59, of a lever 60. 61 is another lever and both the levers 60 and 61 are pivoted to the casting 48, so that they can swing freely. The lower end of the lever 61 is pivoted to the end of another lever 62, and this lever 62 is again pivoted to the lever 60 in such a way that the levers 60 and 61 and the lever 62 form a parallel link motion in conjunction with the portion of the casting 48 between the pivots.

The lever 62 is extended and forked, or two levers 62 may be provided between which is carried a roller 63. 64 is a large depending arm formed as a fork, the upper ends of the tines being pivoted at 65 to the corresponding radial arm 28. This fork is so formed that it embraces the lugs 41, and associated parts, but does not come into contact with the same, thus allowing such parts to slide vertically without interference.

The tines of the fork are connected to or formed with a common lower portion 66, provided with a downwardly and outwardly tapering slot, as shown for the purposes hereinafter explained.

The lower portion also carries or is cast with a projection 66$^a$ to which is attached the stem of the cam roller 67, the bearing of such roller being so constructed that it allows the roller 67 to accommodate itself to the path of the cam 21.

The outer end of the casting 48 is formed with a chamber 68, which constitutes the casing of the blowing head, and to which the inlet nozzle for compressed air and the suction nozzle are attached as hereafter explained. Within the casing 68 is a bushing or sleeve 69, (see Fig. 1$^G$) perforations being provided to allow compression or suction to take place through the walls of this bushing.

Mounted at the top of the part 69 is a cap 70. 71 is a plunger for making the initial blow opening in the top of the parison and the stem of this plunger is carried up through a fitting which is provided with a screw of sudden pitch, corresponding with a similar thread on a rotatable member in connection with the rod 72.

This rod, which is square at its upper end, fits into a square tube 73, with respect to which it can telescope. The rod 72 is pivotally connected at 74 to the fitting controlling the plunger 71, and the tube 73 is pivoted at 75 to a rod 76 journalled in a bearing at the outer end of the corresponding arm 28. To the upper end of the rod 76 is keyed a lever, to the outer end of which is pivoted at 77 a rod 78 which is controlled through a parallel link motion 79 mounted at the top of the fixed arm 28 from a cam roller 80 operated by a fixed cam 81, upon a fixed plate 82, located above the machine.

It may be remarked in passing that the object of this arrangement is to give the rod 72 a partial motion of rotation which being transmitted to the screw threaded member associated with the corresponding screw threaded part in connection with the plunger 71, gives the latter an axial movement at the proper times, so that it is brought into contact with, and withdrawn from the top of the parison.

Mounted below the blowing head and carried by the casting 48 is the ring mould. This comprises two parts 83 and 84 pivoted at 85 to the lower face of the casting 48, a spring, not shown, being provided for causing the members 84 and 83 to be pulled upwards into close proximity with the underside of the head.

The members 83 and 84 are formed with the usual beaded half rings adapted to mould the neck of the bottle at the top and these half rings are kept normally closed together by means of a helical compression spring 86.

For opening the ring mould when required, the following mechanism is provided. 87 is a rod pivotally connected to a fitting 88, which latter has a part passing through the casting 48 and operating a crank arm 202, (Figs. 1$^H$ and 1$^J$,) carrying a roller. Pivoted to the underside of the casting 48 are two bell crank levers 203, provided with rollers 204, operating the ends of the parts 83 and 84, and pushing them inwards when the crank member in connection with the rod 87 is brought against the arm of one of the bell crank levers, the arms of the two bell crank levers being interconnected by a suitable slotted connection.

The rod 87 is squared at its upper portion and telescopes into a square tube 87$^a$ pivotally connected to a rod 89, which passes through a suitable sleeve bearing 90 in the corresponding arm 28.

The upper end of the rod 89 has keyed thereto a lever 91 which is pivoted to a rod 92, in connection with the parallel link motion 93, at the top of the said arm, operated by a rod and cam roller 94, from a fixed cam 95, and also connected with the fixed plate 82, to which reference has already been made.

The object of this arrangement is to enable the parts of the ring mould to be separated at the proper times in order to release the neck of the bottle, the opening being effected from the cam through the rod 87 and the parts returning under the push of the helical spring 86 as soon as the cam permits.

The constructional elements carried by the frames 32, 33, having been described in detail, it will be convenient to consider the method of adjusting the frame and the correlated parts with respect to the bifurcated column or unit within which it is located.

This adjustment has reference to the length of the parison mould which it is desired to employ, and has no reference to the operation of the machine, as each frame 32, 33, when fixed in position is for the time being in rigid connection with the corresponding bifurcated column.

In order to enable the frame to be secured in position, the inner surfaces of each bifurcated column are provided as previously stated, with flat machined faces, upon which are bolted two gib pieces forming a V recess. The gib pieces are permanently bolted upon the inner side, but on the front portion the gib pieces are removable, so that when they are slightly released, the frame and the parts which it carries can be raised or lowered, the removable pieces being afterwards screwed up tight.

It will thus be seen that in order to adjust the vertical position of the parison mould and its associated parts, the gib pieces have to be loosened and the hand wheel 46 has to be rotated so as to loosen the parts 70 39 of the weight 38.

The hand wheel operating the nut 35 is now rotated in the proper direction, raising or lowering the frame 32, 33 as may be required, after which the gib pieces are tightened or locked in position and the screw 45 is screwed up by the hand wheel 46.

It will be seen that in this way the strip 40 has been kept in the correct position with respect to the weight 38, whilst owing to the telescopic connections in the tubes 73 and 88, these parts have automatically accommodated themselves to the new setting of the machine.

It is to be observed that the adjustment of the frame will also cause the roller 63 to be raised or lowered, as the case may be in the slot in part 66 of the fork. As however the fork 64 is pivotally mounted at 65, it follows that as the roller 63 is lowered it would be moved in a horizontal direction to an increasing extent if the slot were not tapered. As however it is necessary for the roller 63 to move in all cases through the same horizontal distance in order to operate the toggle mechanism in the proper manner, the slot is tapered so as to allow the requisite amount of free movement to the fork 64 before it commences to move the roller 63.

The knife which is not described in this specification as it forms the subject of a separate application, Serial No. 399,431, filed July 27, 1920, is also so mounted that it does not interfere with the vertical adjustment of the parts.

The constructional details in connection with the lower portions of each of the bifurcated columns have no immediate reference to my present invention, but is described in my copending application Serial No. 399,430, filed July 27, 1920, so that it is only necessary to consider them very briefly.

110 is a casting carried by the trunnions 31, and constituting a swinging table controlled by a parallel link motion from the weight 113, which is in turn controlled from the double acting cam ring 24.

The swinging table carries the finishing or blowing moulds and the mechanisms for opening and closing the same.

The arrangement in connection with the top of the machine where the distributing systems for compressed air and suction are located will now be briefly considered.

137 are radial pipes communicating with sleeves 138 mounted on a housing rotating in communication with a fixed air tight housing, to the interior of which blowing air is supplied through the conduit 139. The pipes 137 communicate with vertical pipes 140 which pass down to the bifurcated columns, one pipe for each column, the pipe being carried out through suitable joints to the nozzle or connection at the side of the head 68.

141 are other radial pipes communicating with sockets 142 in a rotatable member which is in connection through perforations 143, in the tube 144 with the suction pump.

The tubes 141 are connected to vertical tubes 145, which in turn are connected, one for each bifurcated column, through suitable jointed connections with another nozzle on the head 68.

At the junction of the pipes 137 and 140 are provided valve chambers 146, containing valves operated by solenoids 147 and in a similar way valves are provided in connection with the valve chamber 148 at the junction of the pipes 141 and 145, the valves being controlled by means of solenoids 149.

The non-rotatable portions of the head, including the cam plate 82 are suitably anchored, and prevent the head from rotating by a fixed attachment to some convenient portion of the building.

The driving mechanism for effecting the continuous rotation of the machine consists of an electric motor 156 connected by any suitable gearing with a pinion 157 which meshes with the annulus 15, upon which the rotatable portions of the machine are carried.

Appropriate contact making means are provided in connection with a source of electrical energy for supplying current at the proper times to the various solenoids operating the valves and other electrically operated parts.

The general operation of the machine will now be briefly considered.

In the first place the appropriate parison moulds are fixed in position and the necessary adjustments are effected. For the adjustment of each unit, the slide 32, 33 of that particular unit is raised or lowered and fixed in position as already described and as has been pointed out owing to the peculiar shape of the slot in this part 66, the operation of opening and closing the parison mould at all elevations of the slide is satisfactorily effected.

The special adjustment of the moulds and the general adjustment by raising and lowering the main framework with respect to the wheels, having been effected, the operation of the machine may commence.

At the right hand side of Fig. 1 in the drawing the parison mould 52, has just been lowered owing to the levers 36 and 37 being rocked over by the double acting vertical cam 22, the motion being transmitted as will be readily understood through the roller 44, the sleeve 43, the spring embracing the rod 42, the lugs 41, the strips 40, the weight 38, the levers 36, 37, the link 47 and the casting 48.

It may here be remarked, that in the preferred case, the weight 38 is heavier than the parts which it counterbalances, so that the cam 22 raises the weight when the head and associated parts are to be lowered.

Assuming that the parison moulds have been lowered, as shown in Fig. 1ᴬ, the suction valve is opened by means of the solenoid 149, which causes suction to be produced through the head 68 and around the plug 71, drawing up the molten glass from the tank into the parison mould.

As soon as the necessary amount of glass has been drawn into the parison mould 52, the said mould is raised, as the cam 22 is so shaped that it then allows the weight to overcome the downward pull of the counterbalanced portions.

The operating rod for the plunger, the ring mould and the knife, do not interfere in any way with the free arcing movement of the head and the associated parts, owing to the fact that telescoping and jointed connections are provided.

As the head passes away and before it has cleared the tank the knife is operated to cut off the glass.

Then the plunger 71 is moved up through the operation of the rod 78, as previously described leaving the top of the parison with the preliminary blow opening.

The parison moulds have now risen to their upper position and are ready to be opened. This opening is effected from the cam 21, which draws in the roller 67, swinging in the frame 64 and causing the roller 63 and the link 62, to be pulled inwards, see the left hand side of Fig. 1. Thus the parison moulds are opened through the link 58, the fork 57 and the toggle mechanism and associated parts 56, 55, etc., the arms 49 and 50 swinging apart and separating the halves of the moulds sufficiently to allow for the subsequent rise of the finishing moulds into position.

The finishing moulds are then raised into position, closed around the parison and blowing takes place.

When the blowing is finished and the blowing valve is closed, the ring mould is opened by the rotation through a suitable angular distance of the rod 87, which operation is effected from the rod 92, and the cam 93, in the manner already indicated.

The finishing mould is then lowered carrying with it the article which has been blown, which article is released at the proper time.

Some of the advantages arising from the foregoing constructions may be now briefly noticed.

As regards the unit system of construction, it will have been observed that each of the bifurcated columns carries the parison mould, the blowing head and all its associated parts, so that by detaching any one of the arms 28 from the corresponding face of the chamber 26 and unbolting the lower end of the corresponding bifurcated column from the annulus 15, the whole unit may be quickly removed taking with it the moulds and associated parts and the cam and rods mounted on the arm 28.

In this way should one of the units break down for any reason it can be quickly removed and replaced by another unit, or if no unit is available, it is only necessary to close the corresponding aperture 27, and the machine will continue to work without the unit.

The method of adjusting the parison moulds and their associated parts is also one possessing many advantages as the frames 32, 33 may be lowered or raised so as to give a large range of lengths for the parison moulds, whilst at the same time by the use of the swinging fork 64, with the long tapering slot at the part 65, operating levers for opening and closing the moulds are enabled to accommodate themselves to the different levels of the frame.

The telescopic joints in connection with the tubes 73 and 88 also enable the machine to adapt itself automatically to variations in position of the frame or casting 48 and its associated parts.

Although a double acting vertical cam 22 has been shown for effecting the raising and lowering of the parison mould and its associated parts, this is not an essential feature of the construction.

In some cases a solenoid may be employed for effecting this operation, and this solenoid may be mounted on the rotating framework, say for instance on the arm 28, and co-operate with a magnetizable plunger in connection with the weight 38, or the plunger may be connected to the rotating framework and the coil may be connected to the weight.

In other cases, both a vertical cam and a solenoid may be employed, whilst in other instances a fluid pressure mechanism may be substituted for or may co-operate with the cam or solenoid such for instance as a pneumatic plunger or a plunger operated by steam or hydraulic power.

Figure 2:
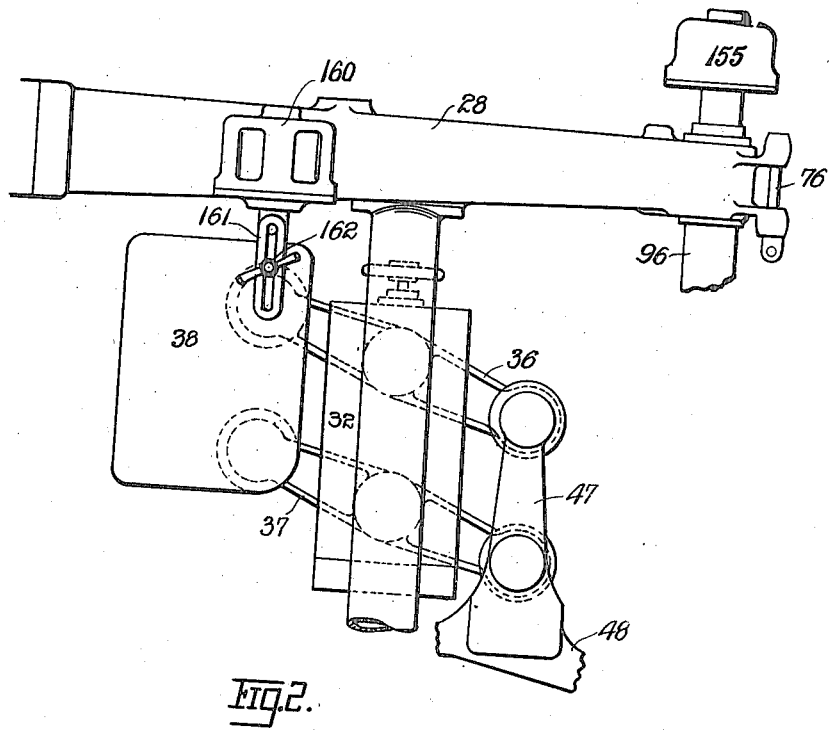
Fig. 2 is a diagrammatic elevation illustrating a modification in which the raising and lowering of the parison mould is effected by an electric solenoid.

One example of the operation of the raising and lowering of the parison mould by means of an electric solenoid is shown at Fig. 2 in which 160 is the coil of a solenoid, mounted on the arm 28. The core of the solenoid has attached thereto, preferably by means of a pivotal attachment, a slotted rod 161, which can be locked to the weight 38, in suitable positions, by means of a screw clamping nut 162. The purpose of this adjustment of the core is to enable its position to be altered when the frame 32, 33, has to be adjusted.

In place of providing cam operating mechanism for opening and closing the parison mould and the ring mould, electrical means such for instance as solenoids, may be employed for this purpose, and conversely instead of providing solenoids, as in the particular machine described, for controlling the valve, cam operated mechanism, or other suitable mechanism, may be employed for these purposes.

Figure 3:
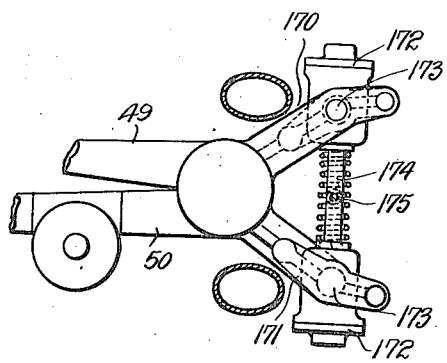
Fig. 3 is a diagrammatic sectional plan illustrating a further modification in which the opening and closing of the parison mould is effected by solenoids.

Fig. 3 is a plan illustrating a construction for opening and closing the halves of the parison mould by means of a solenoid.

The arms of the parison mould carriers 49 and 50 are extended back at 170 and 171 and form or carry frames in which are mounted upon trunnions 173, solenoids 172, the cores of which 174 are pivoted together at 175, and a helical compression spring is inserted between the solenoids. This spring forces the coils apart, when the current is not passing, and the moulds are separated when the current has passed.

As regards the operation of the valve by means of solenoids, it is to be observed that in the machine described, these solenoids are all fitted at the top, in connection with the arms 28, and that the valves are fitted at the top also, but in some cases, where it may be found desirable, the valves, and if necessary the operating solenoids may be fitted in close proximity to the parts to which air is to be supplied or suction applied, for instance in close proximity to the heads.

In some instances, in place of supplying the blowing air and applying the vacuum to the head in the manner described, a sliding blowing cover may be provided, in a manner already well known.

In some instances the lowering and raising of the parison moulds by a parallel link motion may be made automatically to open and close the suction valve, and, where desired simultaneously to close or open the orifice of the blowing pipe, and this function may take place in the blowing head immediately alongside the plug.

One method of carrying this into effect is illustrated at Figs. 4 to 6 of the accompanying drawings, in which the outer end of the lever 37 carries a laterally projecting lug 180, connected through a rod 181 and a yoke member 182 to a pivoted valve operating fork 183. This fork is rotatably mounted on a pin 184, carried by the casting 48ᵃ fixed to the link 47ᵃ, connecting the outer ends of the parallel levers 36, 37. The fork 183 is formed with two downwardly extending limbs 185 and 185ᵃ, both of which are bifurcated at their lower ends, the limb 185 embracing the stem of the suction valve 186, whilst the limb 185ª embraces the stem of the valve 187, controlling the blowing orifice, the valves being arranged side by side. The valve 186 is normally maintained closed by a coil spring 188, located between the washer 189 fixed at the end of the valve stem and a slidable washer 190, whilst the valve 187 is maintained closed by a spring 191, engaging a shoulder 192 and a slidable washer 193. The valves are each provided with fixed collars 194 and 195 respectively.

The operation is as follows:—

When the parison mould is lowered, the outer end of the lever 37 moves through the arc *a* whilst the lug 180 thereon moves through the arc *b*. This movement causes the fork 183 to be rotated about its pivot 184, the link 185 engaging the collar 194 on the suction valve 186, and the washer 193 on the valve 187 controlling the blowing, causing the valve 186 to be opened and the valve 187 to be simultaneously closed. As the parison mould is again raised, the fork 183 is rotated in the opposite direction, whereby the valve 186 is closed by its spring, whilst the valve 187 is opened by the engagement of the limb 185ª of the fork with the washer 195.

In cases where it is not desired to utilize electric solenoids, I so arrange that all the operations and the raising and lowering of the parison mould, opening and closing of the mould and the control of all the valves, in fact all the operations are effected by means of cams or other purely mechanical devices.

In my co-pending application Serial No. 399,432, filed July 27, 1920, I have described a modification in which the parison mold is swung through an arc instead of being raised and lowered vertically.

I claim:

1. A machine for forming glass articles including a stationary frame, a movable frame carried thereby, a pair of levers disposed one above the other and pivotally supported in the movable frame, means whereby said levers may be adjusted vertically in the frame, a link pivotally connecting one end of the levers, a weight pivotally connected with the other end of the levers, means for rocking the levers, and a frame carried by said link having a parison mold and its associated parts thereon.

2. In a machine for forming glass articles, a parison mold carrying frame, means for raising and lowering the parison mold carrying frame, pivoted arms on said frame having parison mold sections thereon, a lever, means for swinging said lever, and means including a toggle lever mechanism and a parallel link lever mechanism for opening and closing said arms upon the movement of said lever.

3. In a rotary machine for the manufacture of glass articles, the combination of a rotatable framework, two levers of the first order, of equal length one pivoted above the other to the said framework, a link pivotally connected to the outer ends of the said levers, another link pivotally connected at the inner ends of the said levers, so as to constitute a parallel link lever mechanism of the first order, a parison mold and its associated parts carried by the outer link, and means cooperating with the inner link for raising and lowering the parison mold at appropriate times, for the purposes set forth.

4. In a rotary machine for the manufacture of glass articles, the combination of a rotatable framework, two levers of the first order, of equal length, one pivoted above the other to the said framework, a link pivotally connected to the outer ends of said levers, another link pivotally connected to the inner ends of the said levers, so as to constitute a parallel link lever mechanism of the first order, a parison mold and its associated parts carried by the outer link, a counterbalance weight in connection with the inner link, and means co-operating with the said inner link for raising and lowering the parison mold at appropriate times, for the purposes set forth.

5. In a rotary machine for the manufacture of glass articles, the combination of a fixed central column, a framework rotatable about the said central column, two levers of the first order, of equal length, one pivoted above the other to the said framework, a link pivotally connected to the outer ends of the said levers, another link pivotally connected to the inner ends of the said levers, so as to constitute a parallel link lever mechanism of the first order, a parison mold and its associated parts carried by the outer link, a counterbalance weight in connection with the inner link, a cam carried by the fixed central column, and means cooperating with the said cam and with the inner link of the lever mechanism for lowering and raising the parison mold and associated parts at appropriate times, substantially as and for the purposes described.

6. In a rotary machine for the manufacture of glass articles, the combination of a rotatable framework, a secondary frame adapted to slide vertically with respect to the said framework, means for adjusting the said secondary frame and for retaining it in various vertical positions, two levers of the first order, of equal length, one pivoted above the other to the said secondary frame, a link pivotally connected to the outer ends of the said levers, another link pivotally connected to the inner ends of the said levers, so as to constitute a parallel link lever mechanism of the first order, a parison mold and its associated parts carried by the outer link, and means cooperating with the inner link for lowering and raising the parison mold at appropriate times, substantially as described.

7. In a rotary machine for the manufacture of glass articles, the combination of a fixed central column, a framework rotatable about the said central column, a secondary frame adapted to slide vertically with respect to the said framework, means for adjusting the said secondary frame and for retaining it in various vertical positions, two levers of the first order of equal length, one pivoted above the other to the said secondary frame, a link pivotally connected to the outer ends of the said levers, another link pivotally connected to the inner ends of the said levers, so as to constitute a parallel link lever mechanism of the first order, a parison mold and its associated parts carried by the outer link, a counterbalance weight in connection with the inner link, and means cooperating with the said inner link for raising and lowering the parison mold at appropriate times, for the purposes set forth.

8. In a rotary machine for the manufacture of glass articles, the combination of a rotatable framework, two levers of the first order, of equal length, one pivoted above the other to the said framework, a link pivotally connected to the outer ends of the said levers, another link pivotally connected at the inner ends of the said levers so as to constitute a parallel link lever mechanism of the first order, a supporting table carried by the outer link, a suction and blowing head carried by the said table, a sectional ring mold, the sections of which are carried by arms pivoted below the supporting table, a sectional parison mold, the sections of which are carried by arms pivoted to the supporting table, means for opening and closing the ring mold, means for opening and closing the parison mold, and means cooperating with the inner link for lowering and raising the parison mold at appropriate times, for the purposes set forth.

9. In a machine for the manufacture of glass articles, the combination of a rotatable framework, two levers of the first order of equal length, one pivoted above the other to the said framework, a link pivotally connected to the outer ends of the said levers, another link pivotally connected at the inner ends of the said levers so as to constitute a parallel link lever mechanism of the first order, a supporting table carried by the outer link, a suction and blowing head carried by the said table, a sectional ring mold, the sections of which are carried by arms pivoted below the supporting table, a sectional parison mold, the sections of which are carried by arms pivoted to the supporting table, means for opening and closing the ring mold, means for opening and closing the parison mold, a counterbalance weight in connection with the inner link, and means for lowering and raising the parison mold at appropriate times, for the purposes set forth.

10. In a machine for the manufacture of glass articles, the combination of a fixed central column, a framework rotatable about the said central column, a secondary frame adapted to slide vertically with respect to the said framework, for adjusting the machine for parison molds of different lengths, means for so adjusting the said secondary frame and for retaining it in various vertical positions, two levers of the first order of equal length, one pivoted above the other to the said secondary frame, a link pivotally connected to the outer ends of the said levers, another link pivotally connected to the inner ends of the said levers, so as to constitute a parallel link lever mechanism of the first order, a supporting table carried by the outer link, a suction and blowing head carried by the said supporting table, a sectional ring mold, the sections of which are carried by arms pivoted to the supporting table, a sectional parison mold, the sections of which are carried by arms pivoted to the supporting table, toggle mechanism adapted to operate the said arms, a sliding rod adapted to operate the said toggle, a swinging arm pivoted to the upper portion of the framework and provided with a slot engaging the said sliding rod, means for swinging the said arm at appropriate times, consisting of a horizontal cam carried by the fixed central column, and a cam follower connected to the swinging arm, and a vertical cam connected to the said fixed column with a follower connected to the inner link of the parallel link lever mechanism, substantially as described.

11. In a rotary machine for the manufacture of glass articles, the combination of a rotatable framework, rotatable about a fixed central column, a secondary frame adapted to slide vertically with respect to the said framework, in order to adjust the machine for parison molds of different lengths and for different levels of the molten glass, means for so adjusting the said secondary frame and for retaining it in various vertical positions, two levers of the first order, of equal length, one pivoted above the other to the said secondary frame, a link pivotally connected to the outer ends of the said levers, another link pivotally connected to the inner ends of the said levers, so as to constitute a parallel link lever mechanism of the first order, a sectional parison mold carried from the outer link, means operating upon the inner link for lowering and raising the parison mold at appropriate times, such means being adjustable in order to regulate and accommodate the dipping according to the various adjusted positions of the secondary frame, substantially as described.

12. In a machine for the manufacture of glass articles, the combination of a fixed central column, a framework rotatable about the said central column, a secondary frame adapted to slide vertically with respect to the said framework, for adjusting the machine for parison molds of different lengths and for different levels of molten glass, means for so adjusting the said secondary frame and for retaining it in various vertical positions, two levers of the first order of equal length, one pivoted above the other to the said secondary frame, a link pivotally connected to the outer ends of the said levers, another link pivotally connected to the inner ends of the said levers so as to constitute a parallel link lever mechanism of the first order, a sectional parison mold carried from the outer link, a counterbalance weight in connection with the inner link, and means operating upon the inner link for lowering and raising the parison mold at appropriate times, such means being adjustable in order to regulate and accommodate the dipping according to the various adjusted positions of the secondary frame, substantially as described.

In testimony whereof, I have hereunto subscribed my name.

ROBERT FREDERICK HALL.